Oct. 8, 1929.  E. V. GLUCK ET AL  1,730,364
GRID LEAK AND CONDENSER
Filed March 27, 1926
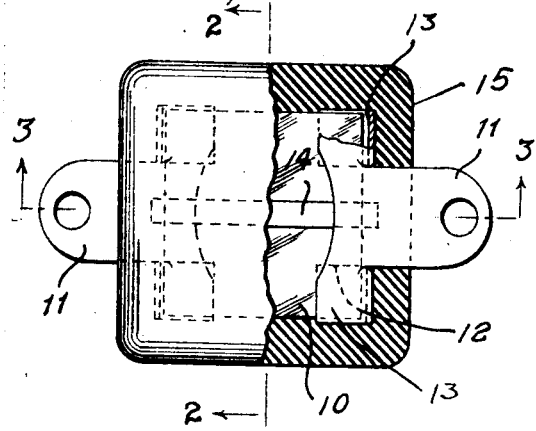
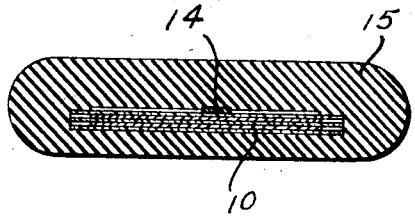
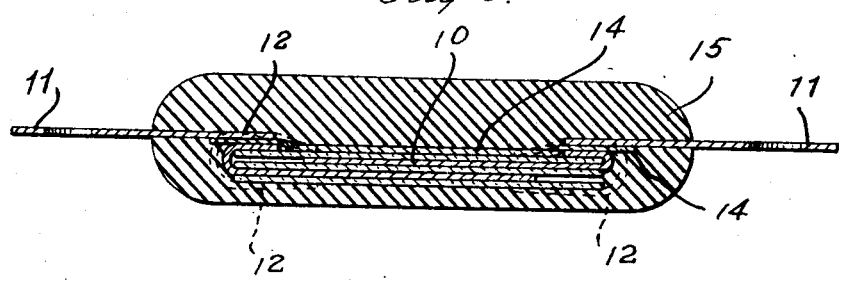
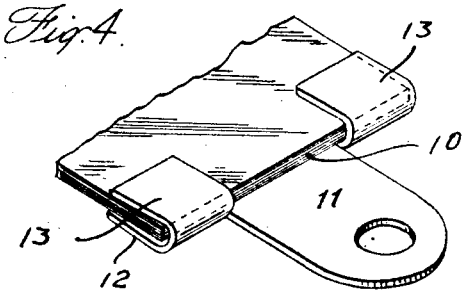
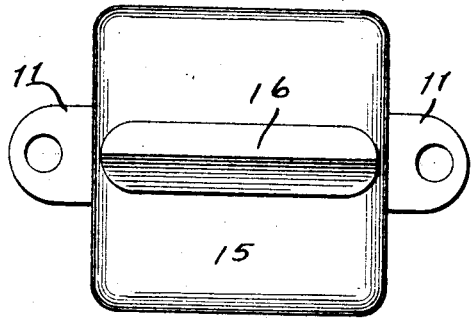
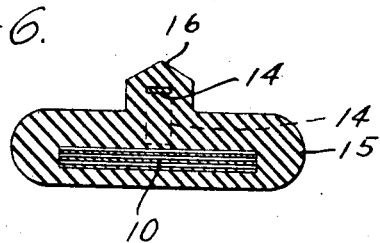
INVENTOR
EDWARD V. GLUCK
ALEXANDER P. HIRSCH.
BY
Edwin F. Murdoch
ATTORNEY Patented Oct. 8, 1929

1,730,364

UNITED STATES PATENT OFFICE

EDWARD V. GLUCK AND ALEXANDER P. HIRSCH, OF BROOKLYN, NEW YORK, ASSIGNORS TO MICAMOLD RADIO CORPORATION, OF NEW YORK, N. Y.

GRID LEAK AND CONDENSER

Application filed March 27, 1926. Serial No. 97,844.

Among the principal objects which the present invention has in view are:—

To provide a compact and efficient grid leak and condenser assembly; to provide in a unitary construction an associated grid leak and condenser; and to provide in a device of this character a novel compact unitary construction.

Drawings

Figure 1 is a top plan view partly in section of a device constructed in accordance with the principles of the invention;

Figure 2 is a transverse section on the line 2—2 of Figure 1;

Figure 3 is a section on the line 3—3 of Figure 1;

Figure 4 is a detail description of a structural detail;

Figure 5 is a top plan view of a modified form of the invention;

Figure 6 is a transverse section through the modification illustrated in Figure 5.

Description

The details of our invention comprise an associated grid leak and condenser wherein the condenser is of the fixed type being made up of a plurality of superimposed condenser plates generally indicated as at 10, the component plates whereof are separated by the usual dielectric and arranged with alternate plates connected to leads at opposite sides of the condenser as is the usual manner of such condenser construction. As illustrated in Figure 4 of the drawings the assembled condenser plates are electrically connected at opposite ends by flat connector strips 11, each having a head 12 provided at opposite ends with integral flanges 13 which are adapted to be bent over the condenser plates and clamped in position as illustrated in Figure 4 to bind the connector and plates in assembled position.

Disposed across the two terminals 11 of the condenser is a grid leak in the form of a strip of litmus paper 14 seated over the insulated top of the condenser plates and having its opposite ends disposed beneath the heads 12 of the terminal connectors whereby a grid leak circuit is maintained across the condenser terminals.

The assembled construction is completely incased in a body 15 of molded insulating cement of suitable characteristics leaving the connector clips 11 extending from opposite side edges thereof to provide a means for attachment in an electrical circuit.

In the modified form illustrated in Figures 5 and 6 the major portion of the grid leak 14 is spaced from the condenser plates 10 by being embedded in an elevated ridge 16 formed integral with the molded body 15 as clearly shown in Figure 6, the end connections of the grid leak being the same as illustrated in the preferred form.

We claim:—

A device of the character described comprising a plurality of superimposed condenser plates spaced apart by an insulating medium, a resistance member seated on said superimposed condenser plates, terminal connectors disposed at opposite ends of said assembled plates and resistance, and means for clamping said connectors over said assembled plates and resistance.

EDWARD V. GLUCK.
ALEXANDER P. HIRSCH.